US009447913B2

(12) United States Patent
Chen

(10) Patent No.: US 9,447,913 B2
(45) Date of Patent: Sep. 20, 2016

(54) ADJUSTING MECHANISM FOR A DISPLAY AND RELATED MOUNTING SYSTEM

(75) Inventor: Chih-Hsiung Chen, New Taipei (TW)

(73) Assignee: Aopen Inc., New Taipei (TW)

( * ) Notice: Subject to any disclaimer, the term of this patent is extended or adjusted under 35 U.S.C. 154(b) by 0 days.

(21) Appl. No.: 13/423,274

(22) Filed: Mar. 18, 2012

(65) Prior Publication Data

US 2012/0305740 A1    Dec. 6, 2012

(30) Foreign Application Priority Data

May 31, 2011 (TW) .............................. 100119116 A

(51) Int. Cl.
*E04G 3/00* (2006.01)
*F16M 13/02* (2006.01)
*F16M 11/04* (2006.01)
*F16M 11/08* (2006.01)

(52) U.S. Cl.
CPC ............ *F16M 13/02* (2013.01); *F16M 11/048* (2013.01); *F16M 11/08* (2013.01)

(58) Field of Classification Search
CPC ..... F16M 11/048; F16M 11/08; F16M 13/02
USPC ....... 248/309.1, 917, 922, 923, 220.21, 201, 248/220.22, 223.41, 224.8, 225.11, 276.1, 248/284.1, 285.1, 286.1, 317, 323, 324
See application file for complete search history.

(56) References Cited

U.S. PATENT DOCUMENTS

| 7,175,146 | B2* | 2/2007 | Kim ....................... | F16M 11/10 211/100 |
| 7,494,099 | B2* | 2/2009 | Shin ....................... | F16M 13/02 248/276.1 |
| 7,537,189 | B2* | 5/2009 | Jung ....................... | F16M 11/10 248/281.11 |
| 7,717,514 | B2 | 5/2010 | Redmann | |
| 7,857,270 | B2* | 12/2010 | Short ...................... | F16M 11/10 248/284.1 |
| 8,517,322 | B2* | 8/2013 | Lam ....................... | F16M 11/10 248/292.14 |
| 2002/0033436 | A1* | 3/2002 | Peng ....................... | F16M 11/10 248/284.1 |
| 2006/0291152 | A1* | 12/2006 | Bremmon .............. | F16M 11/10 361/679.06 |
| 2008/0315049 | A1* | 12/2008 | Bailo ...................... | F16M 11/10 248/176.1 |
| 2010/0038501 | A1* | 2/2010 | Oh .......................... | F16M 11/10 248/201 |
| 2010/0096519 | A1* | 4/2010 | Oh .......................... | F16M 11/10 248/201 |

OTHER PUBLICATIONS

Office action mailed on Nov. 22, 2013 for the Taiwan application No. 100119116, filing date: May 31, 2011, p. 1 line 12-14 and p. 2 line 1-24.
Office action mailed on Jan. 10, 2014 for the China application No. 201110163361.4, p. 3 line 4-33, p. 4-5 and p. 6 line 1-17.

* cited by examiner

*Primary Examiner* — Jonathan Liu
*Assistant Examiner* — Muhammad Ijaz
(74) *Attorney, Agent, or Firm* — Winston Hsu; Scott Margo

(57) ABSTRACT

An adjusting mechanism for a display is disclosed in the present invention. The adjusting mechanism includes a supporter, a bridging component installed on the supporter, a holder for holding the display, a driving component movably disposed on the bridging component, and an actuating component disposed between the driving component and the holder. The driving component moves relative to the bridging component along a first direction to rotate the actuating component, and the actuating component moves the holder relative to the bridging component along a second direction different from the first direction when rotating, so as to adjust a distance between the supporter and the holder.

4 Claims, 7 Drawing Sheets

ADJUSTING MECHANISM FOR A DISPLAY AND RELATED MOUNTING SYSTEM

BACKGROUND OF THE INVENTION

1. Field of the Invention

The present invention relates to an adjusting mechanism for adjusting a position and an angle of a display, and more particularly, to an adjusting mechanism for adjusting a position and an angle of a display so as to be suitable for a video-wall structure and a related mounting system.

2. Description of the Prior Art

In an advanced technology, cathode ray tube (CRT) displays are replaced completely and flat-panel displays (FPD) are main products in a display market. In contrast to huge volume of the conventional cathode ray tube displays, the flat-panel displays have advantages of low power consumption, low radiation, and miniaturized volume. At this time, expansion of dimensions of the flat-panel displays popularizes the miniaturized flat-panel displays in the display market, such as in a domestic display, in an outdoor advertisement, and in an exhibition. A video-wall structure is applied for an enormous frame of an outdoor displaying. While setting the video-wall structure, all displays are located accurately and are arranged closely by professional measurements and orientation so that it is inconvenient for users, such as businessmen, to install by themselves. In addition, because hanging means for hanging each display are separate components, the hanging means of the different displays can not be integrated easily so that the whole video-wall structure is complicated. Thus, design of a simple mounting bracket mechanism for the video-wall structure is an important issue nowadays.

SUMMARY OF THE INVENTION

The present invention provides an adjusting mechanism for adjusting a position and an angle of a display so as to be suitable for a video-wall structure and a related mounting system for solving above drawbacks.

According to the claimed invention, an adjusting mechanism includes a supporter, a bridging component installed on the supporter, a holder for holding a display, a driving component movably disposed on the bridging component, and an actuating component disposed between the driving component and the holder. The driving component moves relative to the bridging component along a first direction. The driving component moves along the first direction for rotating the actuating component, and the actuating component moves the holder relative to the bridging component along a second direction different from the first direction when rotating, so as to adjust a distance between the supporter and the holder.

According to the claimed invention, a first slot and a second slot are formed on the bridging component, an end of the actuating component connected to the driving component slides along the first slot, and the other end of the actuating component connected to the holder slides along the second slot.

According to the claimed invention, a direction of the first slot is parallel to the first direction, a direction of the second slot is parallel to the second direction, and the first direction is substantially perpendicular to the second direction.

According to the claimed invention, the actuating component is a linkage, and the driving component is a screw component.

According to the claimed invention, the adjusting mechanism further comprises a connecting component disposed between the actuating component and the driving component and slidably disposed inside the first slot on the bridging component, and the driving component passes through the bridging component to fix on the connecting component.

According to the claimed invention, the actuating component is a cam, and the driving component is a screw component.

According to the claimed invention, the driving component is for rotating the actuating component, so as to move the holder relative to the bridging component.

According to the claimed invention, the actuating component is a rod member, and the driving component is a screw component.

According to the claimed invention, the driving component presses an end of the actuating component along the first direction, so that the other end of the actuating component presses the holder along the second direction, and the first direction is substantially opposite to the second direction.

According to the claimed invention, the adjusting mechanism further includes a resilient component disposed between the holder and the bridging component for providing a resilient recovering force to move the holder along a direction opposite to the second direction.

According to the claimed invention, a mounting system includes a display and an adjusting mechanism for mounting the display. The adjusting mechanism includes a supporter, a bridging component installed on the supporter, a holder for holding a display, a driving component movably disposed on the bridging component, and an actuating component disposed between the driving component and the holder. The display is slidably disposed on the holder. The driving component moves relative to the bridging component along a first direction. The driving component moves along the first direction for rotating the actuating component, and the actuating component moves the holder relative to the bridging component along a second direction different from the first direction when rotating, so as to adjust a distance between the supporter and the holder.

The adjusting mechanism of the present invention has advantages of simple structure, lower manufacturing cost and easy assembly. The actuating component of the present invention can transfer the application of force into different directions, so the adjusting mechanism can be disposed on the side of the display. The position and the angle of the display relative to the supporter can be adjusted easily and rapidly by controlling the adjusting mechanism at the side of the display, without disassembly of the display from the supporter. Thus, the television wall can be integrated with the plurality of displays via the adjusting mechanisms for preferable sense of sight.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a sectional view of an adjusting mechanism according to a fourth embodiment of the present invention.

DETAILED DESCRIPTION

Figure 1:
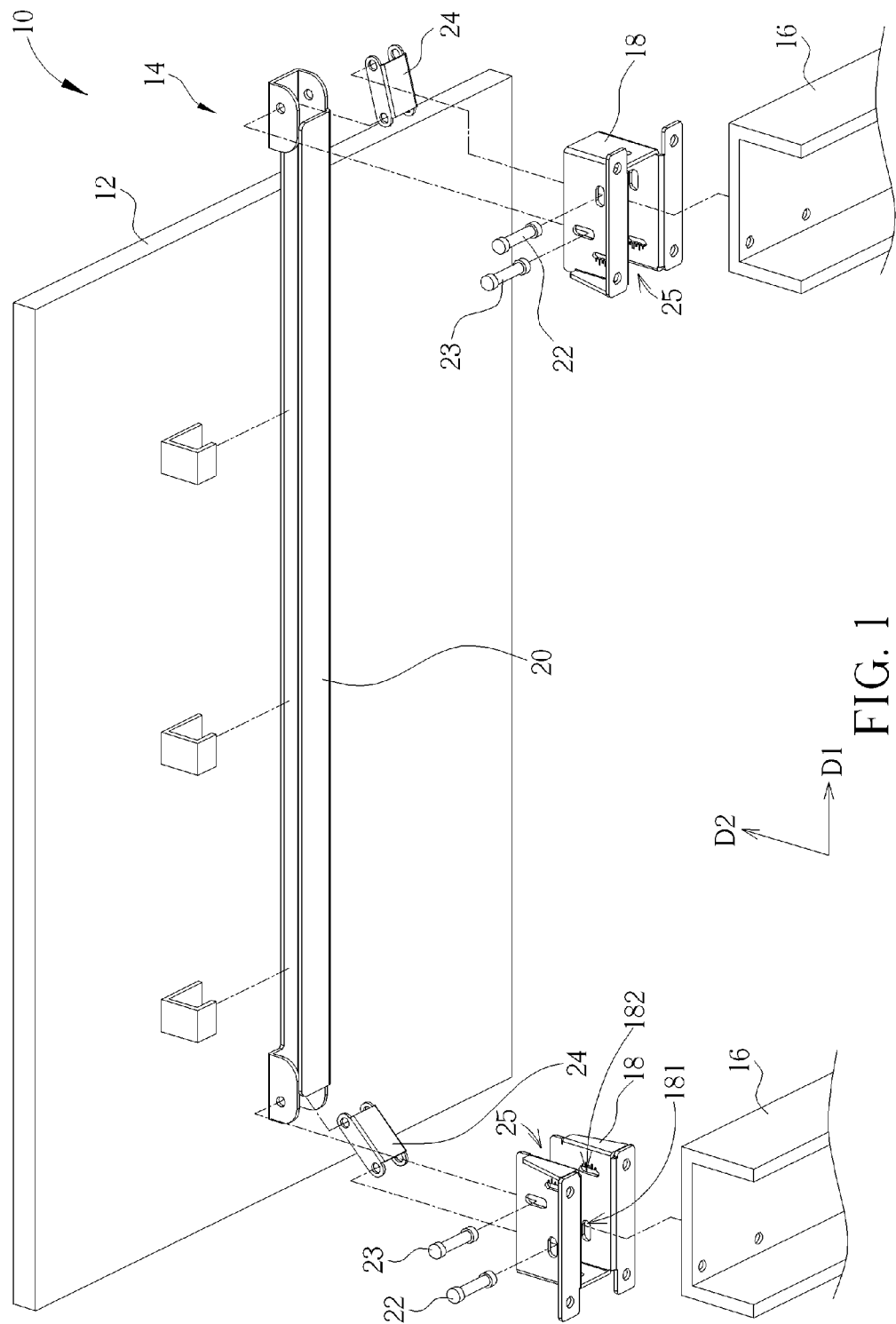
FIG. 1 is an exploded diagram of a mounting system according to a first embodiment of the present invention.
Figure 2:
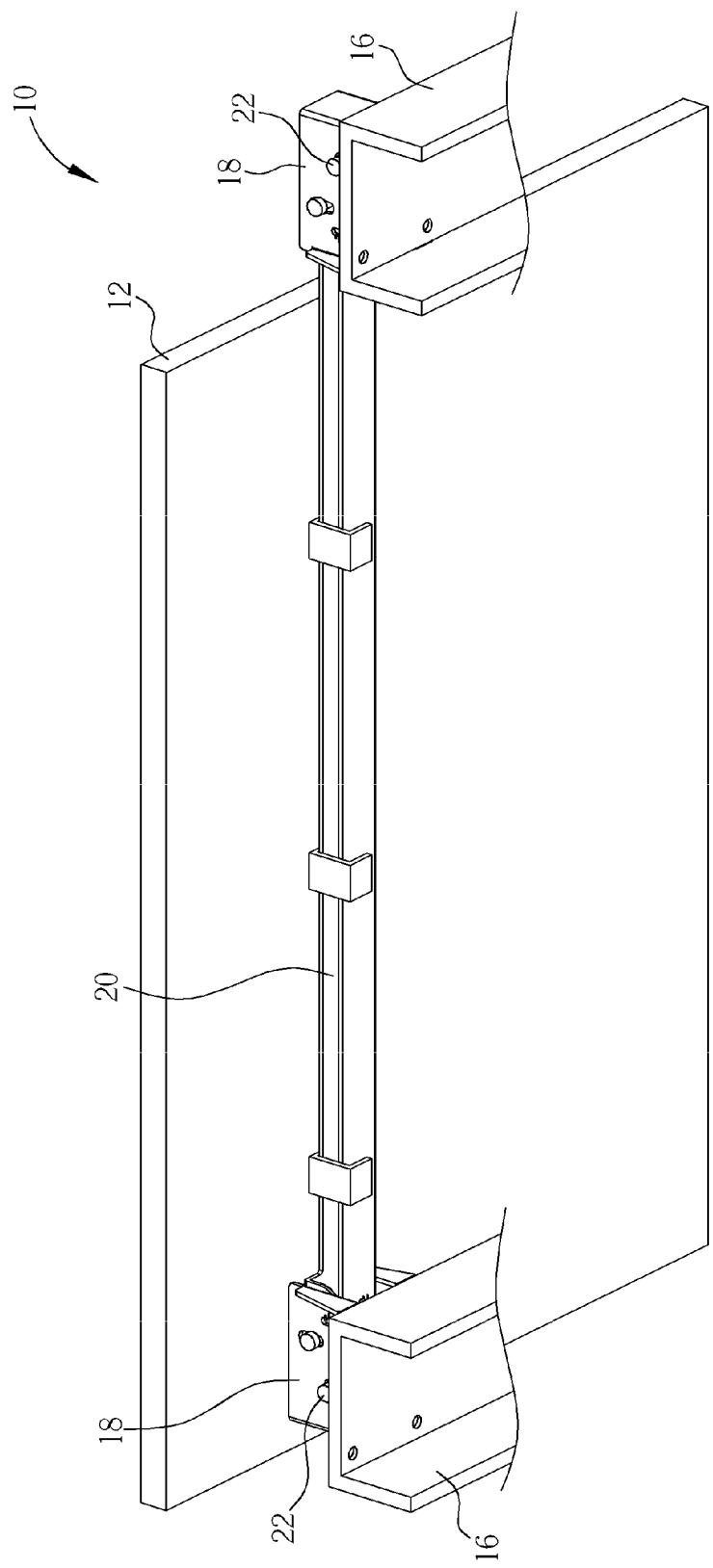
FIG. 2 is an assembly diagram of the mounting system according to the first embodiment of the present invention.

Please refer to FIG. 1 and FIG. 2. FIG. 1 is an exploded diagram of a mounting system 10 according to a first embodiment of the present invention. FIG. 2 is an assembly diagram of the mounting system 10 according to the first embodiment of the present invention. The mounting system 10 includes at least one display 12 and several adjusting mechanisms 14. An amount of the adjusting mechanism 14 corresponds to an amount of the display 12. The mounting system 10 can be a television wall (the video-wall structure), such as a floor TV wall or a hanging TV wall, integrated with a plurality of displays 12. The adjusting mechanism 14 is disposed on the back of each display 12 for adjusting angles of horizontal inclination and vertical inclination, so that the TV wall has preferred sense of sight.

Figure 3:
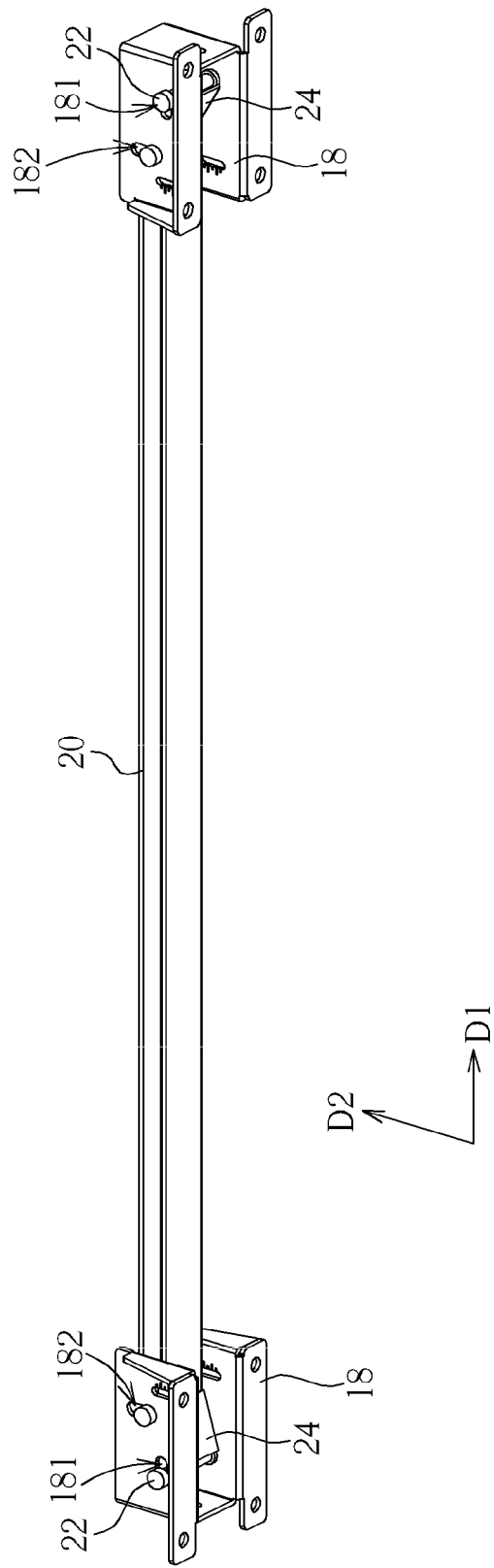
FIG. 3 and FIG. 4 are diagrams of an adjusting mechanism in different operating modes according to the first embodiment of the present invention.
Figure 4:
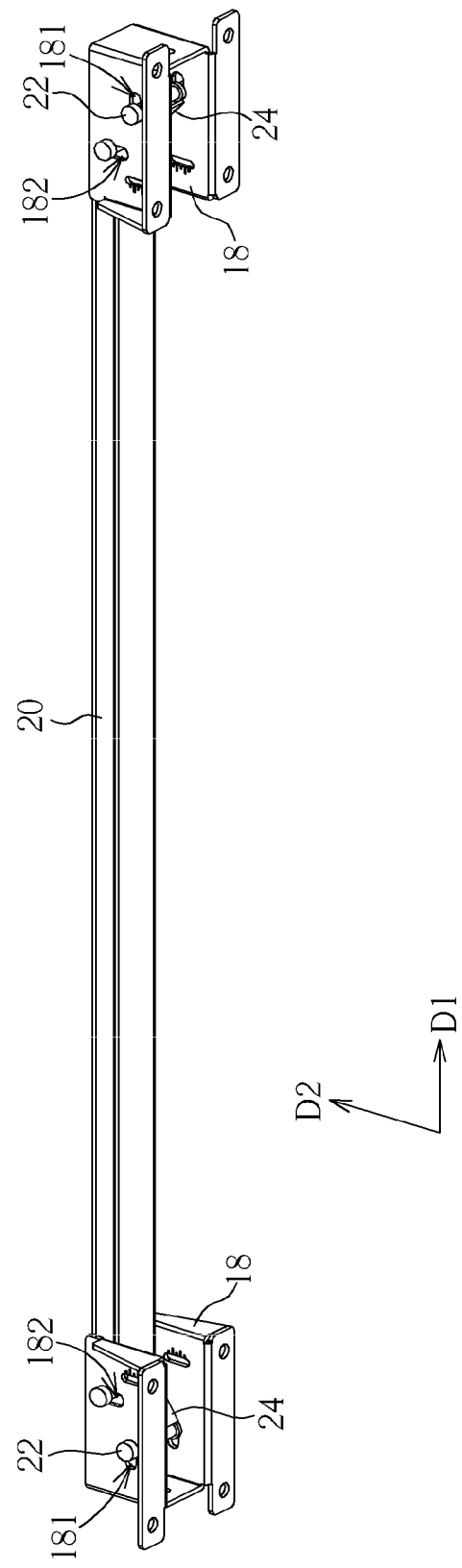

Generally, the mounting system 10 of the present invention can include the plurality of displays 12 arranged in an array, and the adjusting mechanism 14 is disposed on each display 12. One display 12 and the related adjusting mechanism 14 are introduced in the embodiment of the present invention for simplicity. Please refer to FIG. 3 and FIG. 4. FIG. 3 and FIG. 4 are diagrams of the adjusting mechanism 14 in different operating modes according to the first embodiment of the present invention. The adjusting mechanism 14 includes two supporters 16, two bridging components 18 respectively disposed on the corresponding supporter 16, a holder 20 installed between the supporters 16 for slidably holding the display 12, two driving components 22 movably disposed on the corresponding bridging component 18, and two actuating components 24. Two ends of the actuating component 24 are respectively connected to the corresponding driving component 22 and the holder 20. The driving components 22 can be pins for connecting the bridging component 18 and the actuating component 24. In addition, the driving components 22 can be linearly pulled or pushed for moving relative to the bridging component 18 along a first direction D1, so as to rotate the actuating component 24. Therefore, the driving component 22 can be the pin with a handle, and a user can push or pull the driving component 22 via the handle, so as to control a position and a direction of the driving component 22 relative to the bridging component 18.

In the first embodiment, the driving component 22 not only can be the pin for connecting the bridging component 18 and the actuating component 24, but also can be the handle for adjusting the distance between the holder 20 and the supporter 16 manually by the user. The holder 20 can be pushed or pulled by the actuating component 24 when the actuating component 24 rotates, so as to move relative to the bridging component 18 along a second direction D2 different from the first direction D1, and to adjust the distance between the display 12 and the supporter 16. As the supporter 16 is set on the wall, the position and the angle of the display 12 relative to the wall can be adjusted by the adjusting mechanism 14. As the supporter 16 is positioned on the floor, an elevation and an inclination of the display 12 can be adjusted by the adjusting mechanism 14. The holder 20 can be a crossbeam, and the display 12 can slide relative to the crossbeam for adjusting the position of the display 12 relative to the supporter 16.

It should be mentioned that the adjusting mechanisms 14 can be respectively disposed on an upper side and a lower side of the back of the display 12. As the adjusting mechanisms 14 are pushed outwardly, the display 12 moves far away the supporter 16. As the upper adjusting mechanism 14 is pushed inwardly or stopped, and the lower adjusting mechanism 14 is pushed outwardly, an elevation of the display 12 can be adjusted. As the upper adjusting mechanism 14 is pushed outwardly and the lower adjusting mechanism 14 is pushed inwardly or stopped, an inclination of the display 12 can be adjusted. In addition, the adjusting mechanism 14 can be selectively disposed on the upper side or the lower side of the back of the display 12. For example, as the upper side of the display 12 is held on a frame, and the adjusting mechanism is disposed on the lower side of the display 12, the elevation and the inclination of the display 12 can be adjusted by pushing or pulling the adjusting mechanism 12 for varying a distance between the supporter 16 and the lower side of the display 12.

Furthermore, the adjusting mechanism 14 can be disposed on a center position of the back of the display 12. Operation of the mounting system 10 is not limited to the above-mentioned embodiment, it depends on the position of the related adjusting mechanism 14, and the detailed description is omitted herein for simplicity.

In the first embodiment of the present invention, a first slot 181 and a second slot 182 can be formed on the bridging component 18. The first slot 181 can be parallel to the first direction D1, the second slot 182 can be parallel to the second direction D2, and the first direction D1 can be perpendicular to the second direction D2. The actuating component 24 is movably disposed within a cavity 25 of the bridging component 18 such that the actuating component 24 remains within confines of the bridging component 18 when the holder 20 moves in the first direction D1 and the second direction D1. An end of the actuating component 24 connected to the driving component 22 can slide along the first slot 181, and the other end of the actuating component 24 connected to the holder 20 can slide along the second slot 182 via a guiding component 23. Two ends of the actuating component 24 can respectively slide inside the first slot 181 and the second slot 182 when the driving component 22 is moved along the first direction D1, so that the holder 20 can be moved from a position shown in FIG. 3 to a position shown in FIG. 4 along the second direction D2, and the display 12 can move far away the supporter 16. On the contrary, two ends of the actuating component 24 can respectively slide along the first slot 181 and the second slot 182 inversely when the driving component 22 is moved along a direction opposite to the first direction D1, so that the display 12 can move close to the supporter 16 with the holder 20, which means the holder 20 can be moved from the position shown in FIG. 3 to the position shown in FIG. 4. Thus, the position, the elevation and the inclination of the display 12 can be adjusted easily by the adjusting mechanism 14.

Figure 5:
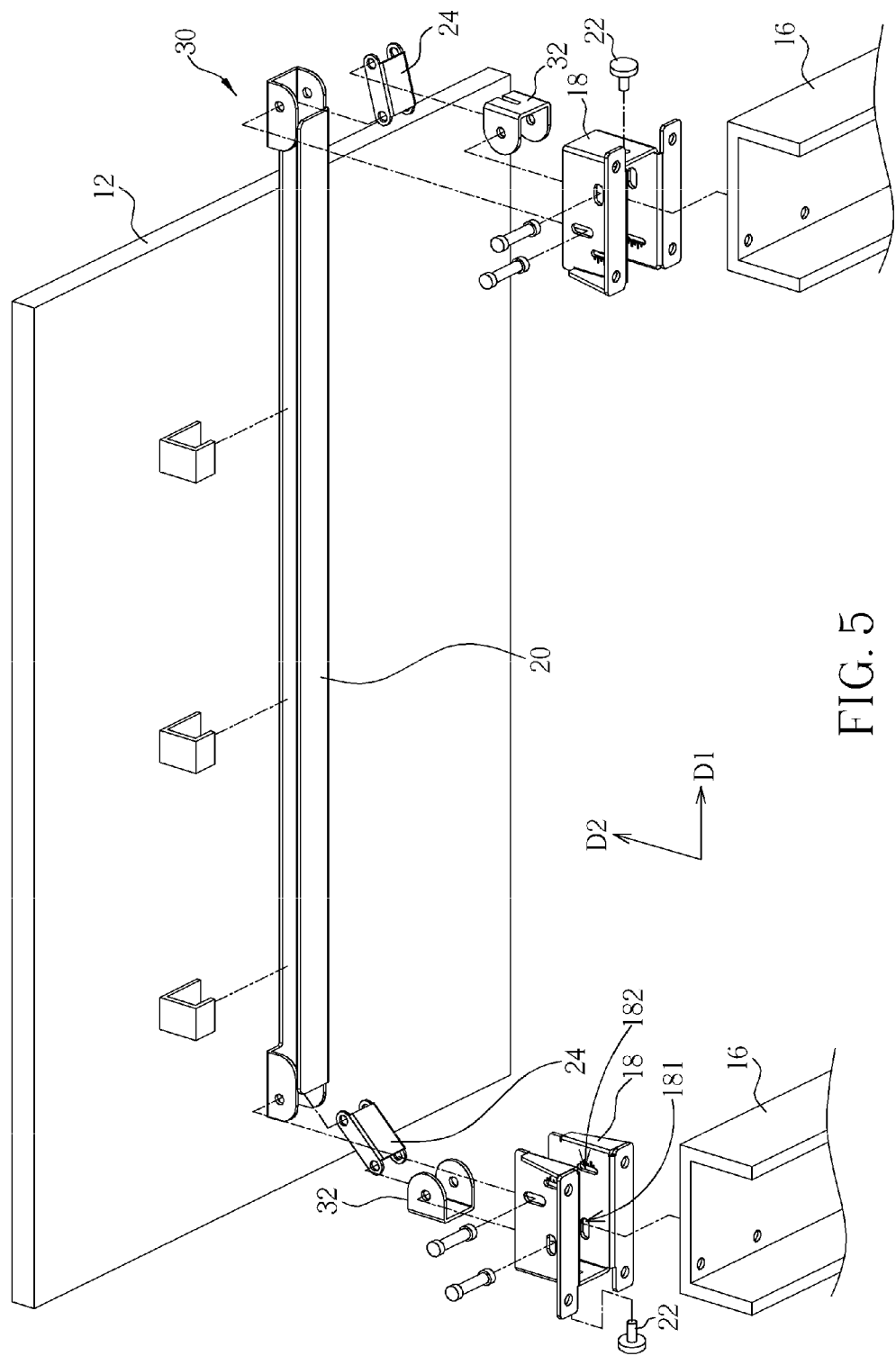
FIG. 5 is an exploded diagram of an adjusting mechanism according to a second embodiment of the present invention.
Figure 6:
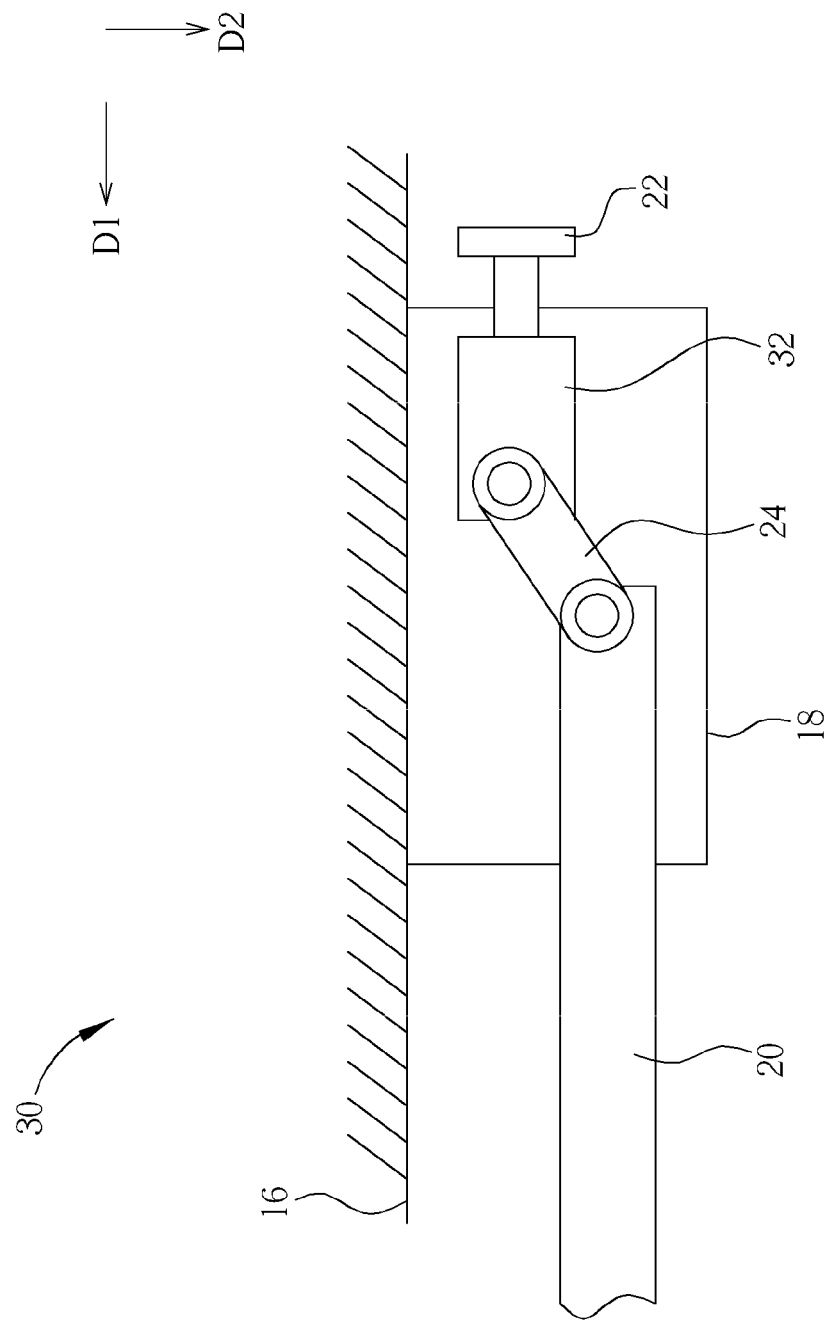
FIG. 6 is a sectional view of the adjusting mechanism according to the second embodiment of the present invention.

Please refer to FIG. 5 and FIG. 6. FIG. 5 is an exploded diagram of an adjusting mechanism 30 according to a second embodiment of the present invention. FIG. 6 is a sectional view of the adjusting mechanism 30 according to the second embodiment of the present invention. The adjusting mechanism 30 includes the supporter 16, the bridging component 18, the holder 20, the driving component 22, the actuating component 24 and a connecting component 32. In the second embodiment, elements having the same numerals as ones of the first embodiment have the same structures and functions. In the second embodiment, the actuating component 24 can be a linkage. The adjusting mechanism 30 can further include two pins for pivoting the bridging component 18, the actuating component 24, the holder 20 and the connecting 32, so the driving component 22 in the second embodiment can be a screw component (which is different from the pin in the first embodiment), such as a screw bolt or a screw rod, for rotating the actuating component 24. Difference between the adjusting mechanism 30 and the adjusting mechanism 10 is that the adjusting mechanism 30 can further include the connecting component 32 disposed between the linkage (the actuating component 24) and the screw component (the driving component 22).

The connecting component 32 can be slidably installed inside the first slot 181 on the bridging component 18, and the screw component (the driving component 22) passes through the bridging component 18 to be fixed on the connecting component 32. As shown in FIG. 6, the driving component 22 moves relative to the bridging component 18 along the first direction D1, and drives the connecting component 32 to press the actuating component 24 when the driving component 22 is set into the bridging component 18, so that two ends of the actuating component 24 respectively slide along the first slot 181 and the second slot 182 on the bridging component 18 (not shown in FIG. 6), and the holder 20 can be moved for far away the supporter 16 along the second direction D2. On the other hand, the driving component 22 can be moved relative to the bridging component 18 along the direction opposite to the first direction D1 for moving the holder 20 close to the supporter 16, so as to adjust the position, the elevation and the inclination of the display 12. The first direction D1 can be perpendicular to the second direction D2 in the second embodiment.

Figure 7:
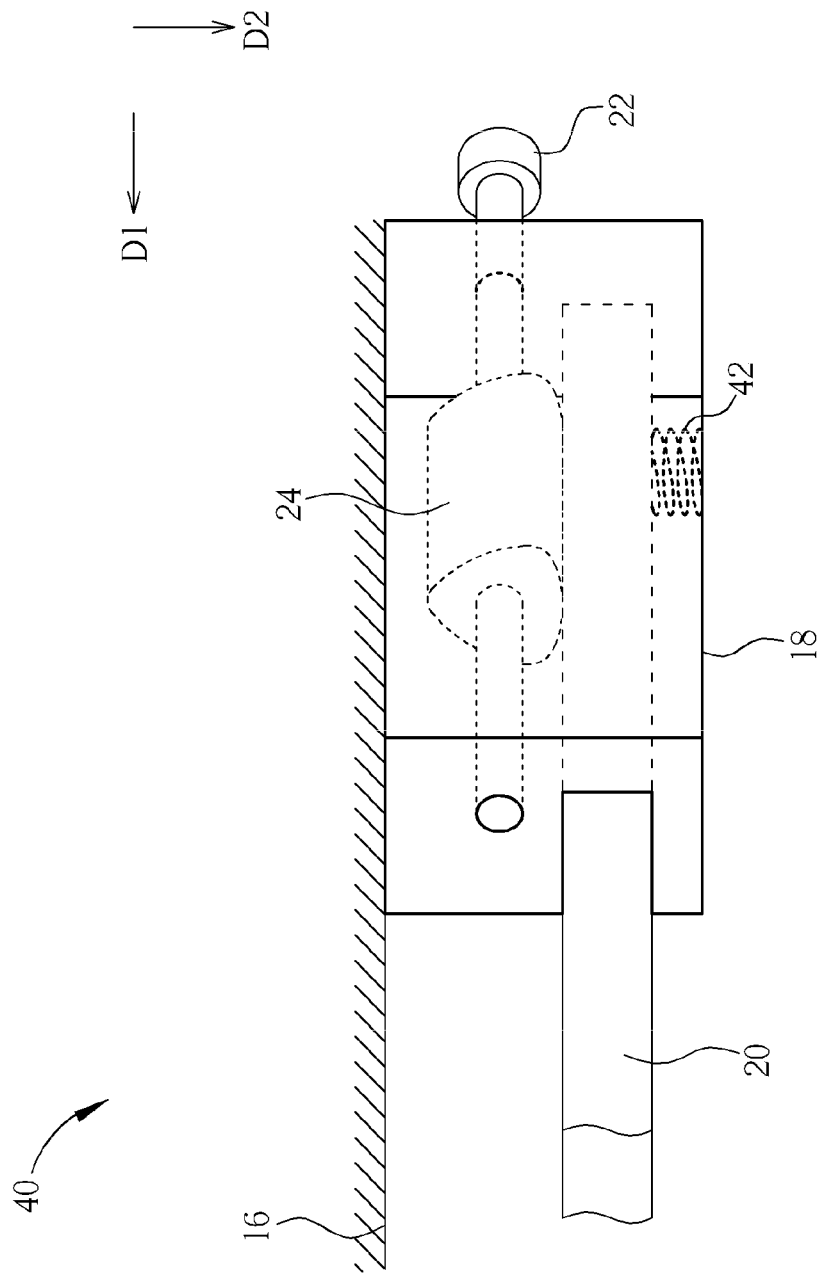
FIG. 7 is a sectional view of an adjusting mechanism according to a third embodiment of the present invention.

Please refer to FIG. 7. FIG. 7 is a sectional view of an adjusting mechanism 40 according to a third embodiment of the present invention. The adjusting mechanism 40 includes the supporter 16, the bridging component 18, the holder 20, the driving component 22, the actuating component 24 and a resilient component 42. The resilient component 42 is disposed between the holder 20 and the bridging component 18 for providing a resilient recovering force to move the holder 20 along the direction opposite to the second direction D2. In the third embodiment, elements having the same numerals as ones of the above-mentioned embodiment have the same structures and functions. Difference between the third embodiment and the above-mentioned embodiment is that the actuating component 24 of the adjusting mechanism 40 can be a cam, and the driving component can be the screw component (such as the screw rod or the screw bolt). The adjusting mechanism 40 can further include the resilient component 42 for recovering the holder 20. The screw component can move relative to the bridging component 18 along the first direction D1 for driving the cam (the actuating component 24) to revolve on its own axis when the screw component (the driving component 22) is rotated manually by the user. Because the cam contacts against the holder 20, the cam can be used for moving the holder 20 far away the supporter 16 along the second direction D2. When the screw component (the driving component 22) is rotated inversely, the cam (the actuating component 24) does not press the holder 20, the resilient component 42 can move the holder 20 close to the supporter 16, so as to adjust the position, the elevation and the inclination of the display 12. The first direction D1 can be perpendicular to the second direction D2 in the third embodiment.

Please refer to FIG. 8. FIG. 8 is a sectional view of an adjusting mechanism 50 according to a fourth embodiment of the present invention. The adjusting mechanism 50 includes the supporter 16, the bridging component 18, the holder 20, the driving component 22, the actuating component 24 and a resilient component 52. The resilient component 52 is disposed between the holder 20 and the bridging component 18 for moving the holder 20 relative to the bridging component 18 as the force applied on the holder 20 is released. In the fourth embodiment, elements having the same numerals as ones of the above-mentioned embodiment have the same structures and functions. Difference between the fourth embodiment and the third embodiment is that the actuating component 24 of the adjusting mechanism 50 can be a rod member, such as a lever, and the driving component 22 can be the screw component, such as the screw bolt or the screw rod. The adjusting mechanism 50 can further include the resilient component 52 for recovering the holder 20. When the screw component (the driving component 22) is rotated, the screw component can move relative to the bridging component 18 along the first direction D1 and simultaneously press an end of the rod member (the actuating component 24), so that the other end of the rod member can push the holder 20 along the second direction D2 to move the holder 20 far away the supporter 16, which means the rod member has function of transferring application of force direction. On the other hand, the rod member (the actuating component 24) does not press the holder 20 when the screw component (the driving component 22) is rotated inversely, so the resilient recovering force of the resilient component 52 can move the holder 20 to a position close to the supporter 16, so as to adjust the position, the elevation and the inclination of the display 12 relative to the supporter 16. The first direction D1 can be opposite to the second direction D2 in the fourth embodiment.

In conclusion, the mounting system of the present invention can push the driving component (the pin) or rotate the driving component (the screw component) relative to the bridging component, and the driving component can press the holder via the actuating component when the driving component moves relative to the bridging component for adjusting the distance between the holder and the supporter. When the driving component is forced along the first direction, the actuating component of the adjusting mechanism can revolve on its own axis by the driving component, so as to push (or pull) the holder to move along the second direction different from the first direction. According to the structural characteristic of the actuating components in different embodiment, for example, the actuating component can be the linkage, the cam or the rod member, the actuating component can transfer the force application from the first direction into the second direction, which is perpendicular or opposite to the initial direction. Therefore, the adjusting mechanism of the present invention can transfer application of force direction for simply operation. In addition, the adjusting mechanisms of the present invention can be symmetrically disposed on the upper side and the lower side (or the left side and the right side) for adjusting the elevation, the inclination, the left and right view angle, and the distance of the display relative to the supporter.

Comparing to the prior art, the adjusting mechanism of the present invention has advantages of simple structure, lower manufacturing cost and easy assembly. The actuating component of the present invention can transfer the application of force into different directions, so the adjusting mechanism can be disposed on the side of the display. The position and the angle of the display relative to the supporter can be adjusted easily and rapidly by controlling the adjusting mechanism at the side of the display, without disassembly of the display from the supporter. Thus, the television wall can be integrated with the plurality of displays via the adjusting mechanisms for preferable sense of sight.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjusting mechanism comprising:
   a supporter disposed on a wall;
   a bridging component installed on the supporter, a first closed slot and a second closed slot being formed on the bridging component;
   a holder for holding a display, the holder is movable between a first direction and a second opposite direction;
   a driving component movably disposed inside the first closed slot on the bridging component, the driving component is movable relative to the bridging component along a third direction, said third direction being different from the first and second directions;
   a guiding component movably disposed inside the second closed slot, the guiding component is movable relative to the bridging component in the first and second directions; and
   an actuating component, being a rigid body, having a first end opposite to a second end, the actuating component movably disposed within a cavity of the bridging component such that the actuating component remains within confines of the bridging component when the holder moves in the first and second directions, the driving component passing through the first end and slidably inserting into the first closed slot, the guiding component passing through the second closed slot, the second end and the holder; wherein the actuating component is configured to move the holder relative to the bridging component, so as to move the holder in the first and second directions, such that the display and the wall are substantially parallel relative to each other when the holder moves relative to the supporter.

2. The adjusting mechanism of claim 1, wherein the first direction is parallel to the second direction and the third direction is substantially perpendicular to the first and second directions.

3. A mounting system comprising:
   a display; and
   an adjusting mechanism for mounting the display, the adjusting mechanism comprising:
   a supporter disposed on a wall;
   a bridging component installed on the supporter, a first closed slot and a second closed slot being formed on the bridging component;
   a holder, the display being slidably disposed on the holder, and the holder is movable between a first direction and a second opposite direction;
   a driving component movably disposed inside the first closed slot on the bridging component, the driving component is movable relative to the bridging component along a third direction, said third direction being different from the first and second directions;
   a guiding component movably disposed inside the second closed slot, the guiding component is movable relative to the bridging component in the first and second directions; and
   an actuating component, being a rigid body, having a first end opposite to a second end, the actuating component movably disposed within a cavity of the bridging component such that the actuating component remains within confines of the bridging component when the holder moves in the first and second directions, the driving component passing through the first end and slidably inserting into the first closed slot, the guiding component passing through the second closed slot, the second end and the holder; wherein the actuating component is configured to move the holder relative to the bridging component, so as to move the holder in the first and second directions, such that the display and the wall are substantially parallel relative to each other when the holder moves relative to the supporter.

4. The mounting system of claim 3, wherein the first direction is parallel to the second direction and the third direction is substantially perpendicular to the first and second directions.

* * * * *